Aug. 25, 1942.  C. D. HAVEN  2,293,822
PROCESS OF METALLIZING GLASS
Filed Oct. 4, 1939   2 Sheets-Sheet 1

Inventor
CHARLES D. HAVEN.
By Frank Fraser
Attorney

Aug. 25, 1942.   C. D. HAVEN   2,293,822
PROCESS OF METALLIZING GLASS
Filed Oct. 4, 1939   2 Sheets-Sheet 2

Inventor
CHARLES D. HAVEN.
By Frank Fraser
Attorney

Patented Aug. 25, 1942

2,293,822

UNITED STATES PATENT OFFICE 2,293,822

PROCESS OF METALLIZING GLASS

Charles D. Haven, Toledo, Ohio, assignor to Libbey-Owens-Ford Glass Company, Toledo, Ohio, a corporation of Ohio Application October 4, 1939, Serial No. 297,815

3 Claims. (Cl. 117—54)

My invention relates broadly to the metallizing of glass and more particularly to an improved alloy for forming metallic coatings thereon.

In the uniting of glass to glass and metals to glass by a soldering operation, it is necessary to first prepare a metallic coating upon the surface of the glass to which the solder will readily adhere without adversely affecting the bond between the metal and glass. To insure permanency of the metallic coating, the metal must be of such character and applied to the glass in such a manner as to obtain permanent adhesion therewith.

I have discovered a new and useful alloy for metallizing glass to form a coating of metal thereon which can be satisfactorily used for the basic coat for soldering operations. Briefly, my improved alloy comprises a mixture of copper and titanium. This alloy can be sprayed upon the glass in a molten condition with a metallizing gun and will become permanently incorporated with the surface of the glass to obtain maximum and permanent adhesion therewith. Although the alloy can be adhered either to cold glass or hot glass, I have found that the strength of the bond of the metal to the glass surface increases directly as the temperature of the glass is increased.

Obviously, my improved alloy may be used in a large number of different ways for the soldering of glass to glass and metals to glass so that the invention is not limited to the use of the alloy in connection with any particular soldering operation or operations or products. By way of example, however, it might be pointed out that this alloy can be advantageously used in the making of multiple glass sheet glazing units and especially that type of unit comprising two or more sheets of glass spaced apart by metal separator means which are bonded to the glass sheets around the marginal portions thereof, through the intermediary of a metallic coating or coatings, to form an all glass-metal hermetically sealed structure. The metal separator means may consist of one or a plurality of strips, preferably of lead, extending around the marginal edge portions of the glass sheets and soldered to the metallic coating or coatings thereon.

Other objects and advantages of the invention will become more apparent during the course of the following description, when taken in connection with the accompanying drawings.

In the drawings, wherein like numerals are employed to designate like parts throughout the same:

Figure 1:
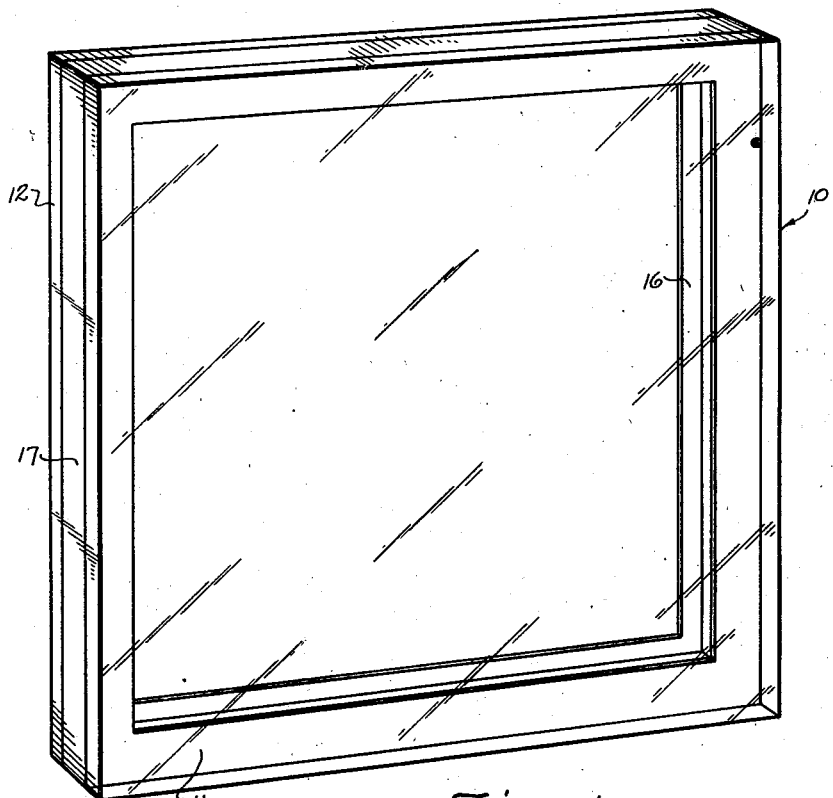
Fig. 1 is a perspective view of one form of multiple glass sheet glazing unit in the construction of which the present invention may be utilized.
Figure 2:
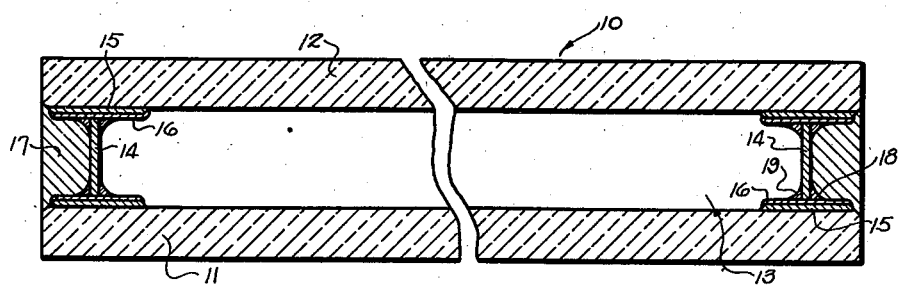
Fig. 2 is a vertical transverse section through the glazing unit.

Referring particularly to Figs. 1 and 2, the numeral 10 designates in its entirety a glass sheet glazing unit produced in accordance with my invention. This glazing unit consists generally of two sheets of glass 11 and 12 arranged in spaced, substantially parallel relation to provide an insulating air space 13 therebetween. This air space is formed by the use of a metal separator strip or strips 14 joined to the glass sheets through the intermediary of the metallic coatings 15 and 16. The separator strips 14 may be arranged inwardly of the outer edges of the glass sheets, if desired, to form a channel which may be filled with a suitable weather-proof seal 17. This seal may consist either of an organic or inorganic material. However, the use of the sealing material may not always be required and, likewise, the separator strips can be associated with the glass sheets so that they are flush with the peripheral edges thereof if desired.

As will be readily appreciated, two or more sheets of glass can be fabricated into a glazing unit of this character, giving one or more spaces between adjacent glass sheets as occasion may require. Therefore, while the invention has been illustrated in the drawings and will be herein described as applied to a two sheet unit, it will be understood that the invention is in no way confined to any particular number of glass sheets used or spaces between the sheets.

Heretofore, in the manufacture of this type of glazing unit, it has been customary to form the metallic coatings 15 on the glass sheets of pure copper. I have found that under proper conditions of application the bond of the copper to the glass surface will be such that in a dry state satisfactory adhesion between the copper and glass can be obtained and that the copper will resist separation from the glass surface by an attempt to scrape the metal from the glass with a sharp razor blade. If, however, the edge of the razor blade is wet with water, the copper coating can be readily removed or peeled from the glass surface without noticeable pressure or effort, with the result that the copper can be completely removed. Since the copper can be removed in the presence of water, it is evident that surface adhesion only has taken place and that this adhesion will fail in use when subjected to strain in the presence of water.

This is of course highly objectionable in any glass metallizing operation and particularly so in the making of multiple glazing units which are exposed to the elements and subjected to all kinds of weather. I have found the "wet scrape test" (i. e., the scraping of the metal with a sharp blade in the presence of moisture) to be an excellent method of determining the strength of bond between the metal and glass and have adopted it as a standard test for this purpose.

The aim of my invention is to render possible the metallizing of glass surfaces by the application of a coating of metal thereto which is not affected by the presence of water or moisture and which can further be satisfactorily used as a base coat for subsequent soldering operations. I have discovered, as a result of considerable experimental and research work extending over a period of many months, that such a metallic coating can be formed on the glass by using an alloy comprising a copper base to which is added a relatively small amount of titanium. As a matter of fact, I have found that the addition of a relatively small percentage of titanium to the copper produces phenomenal results which are entirely unexpected. For instance, I find that the bond of the alloy to the glass surface is materially increased in strength and permanency and that it is impossible to remove the metal by scraping it with a sharp blade when dry. Even more remarkable, however, is the discovery that the bond is of such strength and permanency that it will effectively withstand the action of moisture and cannot be entirely removed even when scraped with a sharp blade in the presence of water. In the case of my alloy, the adherence of the metal to the glass surface is not affected by the presence of water or oil and under these conditions resists the various strains to which a multiple glazing unit is subjected in use as well as the action of rain, frost, high humidity, and the oils of putty when the unit is installed in windows. This phenomenon becomes of great importance when it is considered that a metallized glass surface, such as herein described, is exposed to the elements and in use is subjected to various strains.

My alloy can be sprayed upon the glass with a metallizing gun and will adhere to the glass surface in a manner to produce an exceptionally strong and permanent bond between the glass and metal. Since a metal coat formed of my alloy cannot be removed from the glass by the wet scrape test, it will be apparent that there is not merely surface adhesion between the metal and glass but an actual bonding or fusing together of the metal of the glass surface and the metal of the alloy. The metallic coating formed upon the glass must be neither too heavy nor too thin to give satisfactory results. If too heavy, contraction strains in cooling will cause the alloy to lift glass particles from the glass surface in a progressive manner, whereby the metal can be partially or wholly removed from the glass. If too thin, it will not provide a proper base for soldering operations, as too much glass surface may be exposed. As a guide to thickness, I use a thickness not to exceed that through which light can penetrate. As pointed out above, with other metals, such as copper, the metal coat can be completely removed from the surface of the glass sheet by the wet scrape test. On the other hand, when a metal coat formed of my alloy is subjected to the wet scrape test, the resistance to its removal and the amount of alloy left on the glass increases as the percentage of titanium is increased from a trace of titanium to the maximum amount which may be used but in no case can the metal be entirely removed from the glass.

Although it is to be expressly understood that my invention is not limited to the use of any specific proportions or percentages of the copper and titanium, I might mention that I have used from ½% to 4½% titanium and the balance copper, in the metallizing of glass. As stated above, I have discovered that the strength of the bond of the metal to the glass increases as the amount of titanium is increased. However, I have also found that as the amount of titanium is increased above 2% there is an increase in the fracture of the glass surface where the metal spray hits the glass resulting in almost microscopic chips being removed from the glass body. This fracture of the glass surface I term "point shock." This point shock can be controlled to a degree by highly atomizing the metal spray so as to reduce the shock of any appreciable body of high temperature metal striking the glass surface. The effect of fracture to the glass surface, due to higher titanium content, is to bring about a condition where the metal coating on the glass can set up progressive separation from the glass surface, caused principally by the high number of fracture points closely associated with one another. Therefore, for best all around results in making the double glazing units such as herein described, I recommend the use of an alloy comprising from 1½% to 2½% titanium and the balance copper. An alloy of this mixture can be satisfactorily sprayed upon the glass with a metallizing gun and results in a bond of exceptional strength not only under dry conditions but also under wet conditions. Moreover, with this mixture I am able to normally control the glass fracture effect to a point where it is not objectionable. It will of course be appreciated that the relative proportions of titanium and copper may be varied to suit different conditions and different metallizing operations.

It is preferred that the separator strips 14 be made from lead and that the lead separator strips and metallic coatings 15 on the glass be joined together by means of the layers 16 of solder or other inorganic bonding material. The soldering of the parts together is in effect a sweat job and the materials are so controlled both as to composition and form that reinforcing or strengthening fillets or accumulations of solder 18 and 19 are formed on both sides of the separator strips to strengthen the construction and thus help to insure its permanency as will be more clearly hereinafter described.

The use of ordinary solder results in relatively high working temperatures with the soldering irons or other sources of heat whereby undesirable strains may be set up between the metal coat and the glass. Therefore, it is preferred to make use of a low melting point solder with a wide plastic range of melting so as to reduce the temperature of applications and make use of a more plastic range of the solidifying points of the solder for the purpose of easier assembly. There are a number of variations of soft solders which can be used and one which I have found to work satisfactorily consists of approximately 10 parts bismuth, 40 parts lead, and 50 parts tin.

Figure 3:
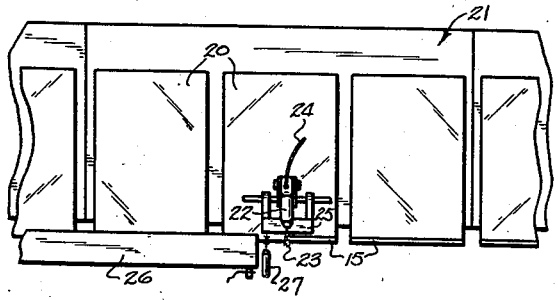
Fig. 3 is a fragmentary plan view of one form of apparatus which may be used for heating the marginal edge portions of the glass sheets and for applying the metallic coating thereto.

Although, as stated above, the glass may be metallized when cold, it is preferred, especially in the fabricating of multiple glazing units, that the marginal edge portions of the glass sheets to be metallized be heated prior to the spraying of the metal thereon. In Fig. 3 is illustrated one type of apparatus and method which can be used in heating the glass sheets and in applying the metallic coatings 15 thereto. As shown, the glass sheets 20 to be metallized rest horizontally upon and are carried forwardly by a suitable conveyor 21 beneath a metallizing gun 22. This gun may be of any construction capable of producing a spray of metal 23 which can be directed upon the pre-selected portions of the glass sheets moving thereunder. However, I prefer that a spray gun be used in which the copper-titanium alloy wire 24 is fed into the gun, melted, and sprayed in fine particles upon the glass. The deposit of metal upon the glass is not only controlled by the relative position of the gun with respect to the glass, speed of wire through the gun, and speed of movement of the glass, but also by a guard member 25 which may be used for this purpose.

Before the metal is sprayed upon the glass, the marginal portions of the glass sheet are first heated to the desired temperature. The exact temperature used will vary somewhat with the size and thickness of glass, but in all cases where heating is resorted to, care should be exercised to avoid warpage of the glass. For ordinary plate and window glass, I have found a temperature of between 500 and 600 degrees F. to be satisfactory although this temperature may be varied to suit the particular metallizing operation. In fact, in some cases it may not be desired to heat the glass at all.

The alloy herein described is of great value in permitting a satisfactory bond when applied to cold or cool glass. In metallizing the edges of glass wherein the edges are heated, I find that the glass, as for illustration glass ⅛ in. thick, will become bent or distorted at a given temperature, whereas thicker glass, as for illustration ¼ in. thick, may remain perfectly flat at the same glass temperature. If the temperature is raised in both cases, it is possible for glass breakage to take place. It is therefore obvious that the ability to lower the glass temperature when metallizing the edges, as described, will be of practical benefit.

In order to provide a strong enough bond with other metals, such as copper, it has been found necessary to use high glass temperatures since proper bonding, even when subjected to a scraping test with a dry razor blade would show a weak bond. The alloy herein described reacts in an entirely different way, providing a satisfactory bond to cold or cooler glass surfaces if and when the size of the glass or thickness of the glass requires low glass temperatures to be used.

As the glass sheet is carried along by the conveyor 21 and before it reaches the metal spray gun 22, the forward marginal edge portion of the sheet, which projects beyond the conveyor, passes through an electrical heating device 26. The number of heaters and length of heating zone are dependent upon the speed of the machine and exact operating temperatures desired. After the glass sheet passes beyond the heating device 26 and just before the metal is sprayed thereon, the marginal edge portion thereof is subjected to the action of one or more burners 27 which heat the surface of the glass to the desired maximum temperature for the reception of the metal spray.

The heating means is so controlled that when the glass reaches a position under the metal spray gun, it is within the predetermined temperature range desired. The conveyor 21 is preferably moved continuously forwardly and successive sheets of glass are presented progressively to the spray of metal 23 issuing from the gun 22.

Although it is preferred that the marginal edge portion only of the glass sheet be heated, the entire sheet may be heated if desired, and in some cases this may be found more satisfactory. The invention is also not limited to the use of any particular air pressure for atomization of the metal and, likewise, a wide range of flame and spray metal temperture can be used. Various gases and combinations of gases can also be used in the spraying operation, such as, for example, acetylene, propane, and hydrogen, in combination with oxygen.

Figure 4:
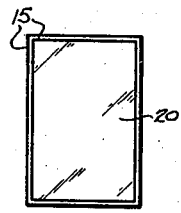
Fig. 4 is a face view of one of the glass sheets, with the metallic coating applied entirely around the marginal edge portions thereof.

After one edge or marginal portion of the glass sheet has been coated with metal, it is of course necessary to similarly treat the remaining edges or marginal portions before fabricating the glass into a double glazing unit. A glass sheet 20 having the four marginal portions thereof provided with the metallic coating 15 is shown in Fig. 4.

Figure 5:
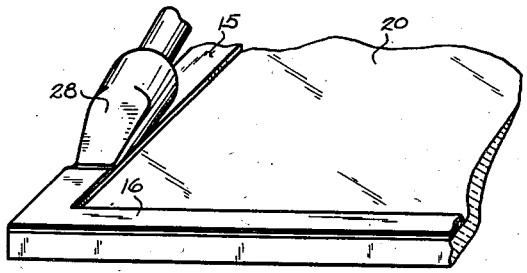
Fig. 5 is a fragmentary perspective view illustrating the depositing of a coating of solder upon the metallized border on the glass sheet.

After the metallic coating 15 has been applied to the glass sheet, it is then further prepared by applying thereto the layer 16 of solder which, as stated above, consists preferably of a low melting point solder. To insure a firm bond, a suitable soldering flux, of which there are a large number, is preferably used to get a permanent satisfactory union between the solder layer 16 and metallic coating 15 on the glass. This flux can be applied to the metallic coating by means of a brush or in any other desired manner. However, after the metallic coating 15 has been applied to the glass, there is a tendency toward oxidation thereof. Therefore, to facilitate tinning of the metal coated glass, this oxidation should be removed before the flux is applied and for this purpose the metallic coating may be subjected to a fine hydrogen flame. The flux treated metallic coating may then be coated with the layer of solder 16 in the manner shown in Fig. 5, wherein a soldering iron 28 is being run over the metallic coating to leave the solder layer thereon.

Figure 6:
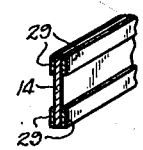
Fig. 6 is a fragmentary perspective detail view showing the metal separator strip after it has been pre-coated with solder.

After two sheets of glass have been provided with the metallic coatings 15 and 16 they are adapted to be secured together in spaced, substantially parallel relation as shown in Fig. 1 by means of the interposed metal separator strips 14. The separator strips 14 are preferably formed of lead or a lead alloy and to enable joining of the separator strips to the metal coated glass sheets there is applied to both sides of the strips along the marginal edges thereof, first a flux and then a deposit of solder 29 (Fig. 6).

The solder deposits 29 applied to the edges of the separator strips 14 consist preferably of a low melting point solder having a wide plastic range with a minimum plastic temperature. The use of a low melting point solder is also of benefit during the time of sweating the soldered metallic coating on the glass to the soldered lead separator strip whereby a low temperature iron may be used without melting down the lead strips.

Figure 7:
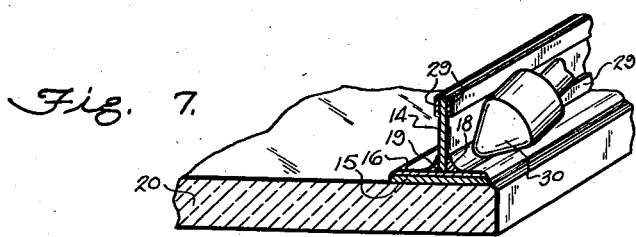
Fig. 7 is a fragmentary perspective view showing the bonding or sweating of the metal separator strip to one of the glass sheets.

To join the prepared separator strips 14 to one of the glass sheets, they are associated therewith substantially as shown in Fig. 7. Ordinarily, it is desirable to place the separator strips back from the edges of the glass sheet and approximately centrally of the metallic coating 15 to produce the channel for receiving the weather-proofing seal, although this is of course a matter of choice.

An electric iron 30 or other heating means may be employed to elevate the temperature of the solder deposits 29 and the solder coating 16 to induce flowing of the solder to produce a fillet 18 on one side of the separator strips and a second fillet 19 on the opposite side of said strips. In this way, the solder completely surrounds the edges of the separator strips giving what may be called a sweat joint and producing fillets on one or both sides of the separator strips to give a balanced type of joint capable of standing strain and stresses in both directions laterally of said separator strips.

For purposes of illustration, the fillets 18 and 19 are shown as separate from the solder coating 16 on the metallized border 15. While these solder deposits are of course independent of one another initially, part of the solder being applied originally to the separator strips and the other solder being applied to the metallized coating on the glass, during the joining together the solder of course blends or amalgamates into a single mass or volume of solder permanently adherent to the separator strips and metallized coating on the glass and shaped as fillets for mechanical strength.

In joining the separator strips to the first sheet of glass, it is obviously possible to apply the soldering iron to both sides of the separator strips for soldering purposes, but this of course is impossible when the second sheet of glass is being joined to the separator strips. However, by preparing the separator strips with substantial deposits of solder on both sides thereof, the heat applied on one side of the strips is sufficient to cause proper flowing of the solder on both sides. That is, in Fig. 7 proper control of temperature application with the iron 30 in the manner shown will result in the formation of not only the fillet 18 upon that side of the separator strips in contact with the iron but will also result in formation of the fillet 19 on the opposite side of the separator strip.

Figure 8:
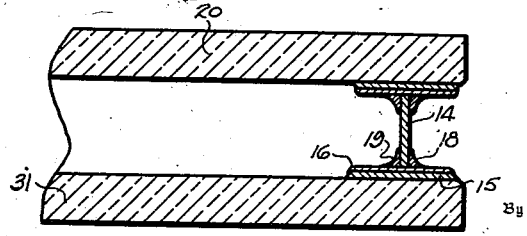
Fig. 8 is a fragmentary transverse section through the glazing unit after the metal separator strip has been secured in position between two sheets of glass.

After the separator strips have been joined to the first sheet of glass, the assembly so formed is then preferably inverted over a second sheet of glass 31 as illustrated in Fig. 8, and the soldering job completed by operating the iron or other heating element on the exterior coating of solder carried by the separator strips. This, as has already been explained, will result in sweating together or joining of the separator strips and prepared metal coatings on the glass, as well as formation of the fillets 18 and 19. While I have referred to the separator means as comprising metal strips, a single length of metal may be used for the separator and shaped to form a continuous strip.

I claim:

1. The process of metallizing glass, including the step of spraying a molten metal alloy upon the glass comprising approximately ½% to 4½% titanium and the balance substantially all copper.

2. The process of metallizing glass to form a base coat for subsequent soldering operations, including the steps of spraying a molten metal alloy upon the glass comprising approximately ½% to 4½% titanium and the balance substantially all copper, and in controlling the application of the molten metal to the glass so that the thickness of the metal coat will not exceed that through which light can penetrate.

3. The process of metallizing glass to form a base coat for subsequent soldering operations, including the steps of heating those portions of the glass to be coated, and then spraying upon the glass while heated a molten metal alloy comprising approximately ½% to 4½% titanium and the balance substantially all copper.

CHARLES D. HAVEN.